(12) United States Patent
Fan

(10) Patent No.: US 11,641,218 B2
(45) Date of Patent: May 2, 2023

(54) FIXING SUPPORT BRACKET FOR CHARGING CONNECTOR

(71) Applicant: Eagle Fan, Hsinchu (TW)

(72) Inventor: Eagle Fan, Hsinchu (TW)

( * ) Notice: Subject to any disclaimer, the term of this patent is extended or adjusted under 35 U.S.C. 154(b) by 0 days.

(21) Appl. No.: 17/486,979

(22) Filed: Sep. 28, 2021

(65) Prior Publication Data
US 2023/0099050 A1 Mar. 30, 2023

(51) Int. Cl.
*H04B 1/3883* (2015.01)
*H04B 1/3877* (2015.01)
*F16M 13/02* (2006.01)

(52) U.S. Cl.
CPC ......... *H04B 1/3883* (2013.01); *F16M 13/022* (2013.01); *H04B 1/3877* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,378,625 B2* | 2/2013 | Gourley | ............ | H02J 5/00 248/176.1 |
| 9,143,180 B2* | 9/2015 | Shen | ............ | H04B 1/3883 |
| 9,147,973 B1* | 9/2015 | Madison | ............ | H01R 13/6395 |
| 10,945,345 B2* | 3/2021 | Lovette-Cephus | .. | F16M 13/022 |
| 11,557,864 B2* | 1/2023 | Varjabedian | ......... | H01R 31/065 |
| 2008/0272258 A1* | 11/2008 | Wysoczynski | ......... | F16M 11/22 211/26 |
| 2011/0187323 A1* | 8/2011 | Gourley | ............ | H02J 7/02 320/111 |
| 2015/0129722 A1* | 5/2015 | Green | ............ | H02J 7/0044 248/51 |
| 2015/0211677 A1* | 7/2015 | Driscoll | ............ | F16M 13/022 248/205.1 |
| 2018/0287425 A1* | 10/2018 | Mortun | ............ | H02J 7/0044 |
| 2019/0281713 A1* | 9/2019 | Lovette-Cephus | .... | H04B 1/385 |

* cited by examiner

*Primary Examiner* — Monica E Millner
(74) *Attorney, Agent, or Firm* — Lin & Associates Intellectual Property, Inc.

(57) ABSTRACT

A fixing support bracket for charging connector is provided, comprising a tightening ring and a carrying unit, wherein the tightening ring is elastic and can expand when stretched, the carrying unit is engaged to a partial section of the tightening ring, the carrying unit is provided with at least a front stopper and at least a rear stopper, with a placement space between the front stopper and the rear stopper, the placement space is used for placing an object, and the object is an electronic mobile device. As such, the electronic mobile device can be carried by the fixing support bracket during charging.

16 Claims, 16 Drawing Sheets

FIXING SUPPORT BRACKET FOR CHARGING CONNECTOR

BACKGROUND OF THE INVENTION

1. Field of the Invention

The present invention relates generally to a fixing support bracket, and more particularly, to a fixing support bracket to be fixed at a horizontal plug during charging, so as to provide placement of an electronic mobile device.

2. The Prior Arts

Electronic mobile devices, such as mobile phones, audio and video players, small cameras, and so on, are popular products, and often need to be recharged after a period of time before subsequent use. The common way of charging is to connect the mobile phone with a cable provided by a charger, and then plugged into a wall socket. If a connector of a specific specification, such as a USB port, is used at the other end of the cable, unless the socket has a corresponding socket, an adapter must be inserted into the socket, and then the connector must be inserted into the adapter. As such, it can often be seen that a mobile phone lies on the floor adjacent to the socket, and the connected cable is lying around or even tangled. In such scenario, not only is it easily to scratch the surface of the mobile phone, it is also dangerous if someone accidentally stumbles on or trips over the cable or the mobile phone. Therefore, some users may use a set of extension cords to extend the power supply on the desktop and charge on the desktop, or place a small chair near the wall socket for the mobile phone being charged to be placed on the small chair, thereby preventing accidents, but these two methods are still impromptu at best.

SUMMARY OF THE INVENTION

To solve the aforementioned problems, the primary objective of the present invention is to provide a fixing support bracket for charging connector when charging the mobile phone with a vertical wall socket. The fixing support bracket carries the mobile phone to reduce accidental tripping to cause damage to the mobile phone.

To achieve the objective, the fixing support bracket for charging connector of the present invention includes a tightening ring and a carrying unit; wherein the tightening ring is elastic and expands in diameter when stretched, the carrying unit is engaged to a partial section of the tightening ring, at least a front stopper and at least a rear stopper are erected on the carrying unit, with a placement space between the front stopper and the rear stopper, and the placement space is used for placing an object.

In a preferred embodiment, a charger has a plug, and the tightening ring can be sleeved on the periphery of the plug.

In a preferred embodiment, the front stopper is erected on the carrying unit and is adjustable in position.

In a preferred embodiment, the carrying unit is disposed with a set of protruding teeth on a top surface, a protruding rail on both sides, a unidirectional tooth on a bottom surface of the front stop, and each side extends downward to form a hook-shaped holder; when assembling, the front stopper contacts the protruding rail by two holders, so that the front stopper can move on the carrying unit, and the unidirectional tooth is clamped in the protruding teeth at an appropriate position.

In a preferred embodiment, a stopping block is formed on a bottom of the carrying unit, and a gap is formed between the stopping block and the carrying unit for placing a partial section of the tightening ring so that the carrying unit is engaged to the partial section of the tightening ring.

In a preferred embodiment, the present invention further comprises an adapter, the tightening ring can be sleeved on the periphery of the adapter, and at least a matching hole is formed in the middle of the adapter, and the matching hole corresponds to a connector, the connector corresponds to an appearance of a port, and the port is one of USB, USB Type-C, Micro USB, and Lightning.

In a preferred embodiment, the matching hole is a cross-shaped hole, the matching hole is formed by a first hole pattern crossing a second hole pattern, the shape of the first hole pattern is different from the second hole pattern, and the first hole pattern and the second hole pattern respectively correspond to different connector shapes.

In a preferred embodiment, the present invention further comprises a support carrier, the support carrier comprises a carrier base connected to a sleeve part, the carrier base is for accommodating a wireless charging sensor, the sleeve part is hollow with an opening facing downward, and the size of the hollow of the sleeve part corresponds to the rear stopper; when the sleeve part is sheathed on the rear stop, the support carrier can be erected on the carrying unit.

In a preferred embodiment, the present invention further comprises a receiving carrier, the receiving carrier comprises an upright support part and a horizontal support plate, the support part is hollow with an opening facing downward, and the size of the hollow of the support part corresponds to the rear stopper; when the support part is sheathed on the rear stopper, the support plate can be horizontally positioned on the carrying unit.

In a preferred embodiment, the support plate is further formed with a receiving groove, and the receiving groove is used for receiving a wireless charging sensor.

Accordingly, the fixing support bracket for charging connector of the present invention, whether with wired charging or wireless charging, allows the mobile phone to be placed on the fixing support bracket during the charging to avoid accidental tripping over to prevent damage to the mobile phone.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
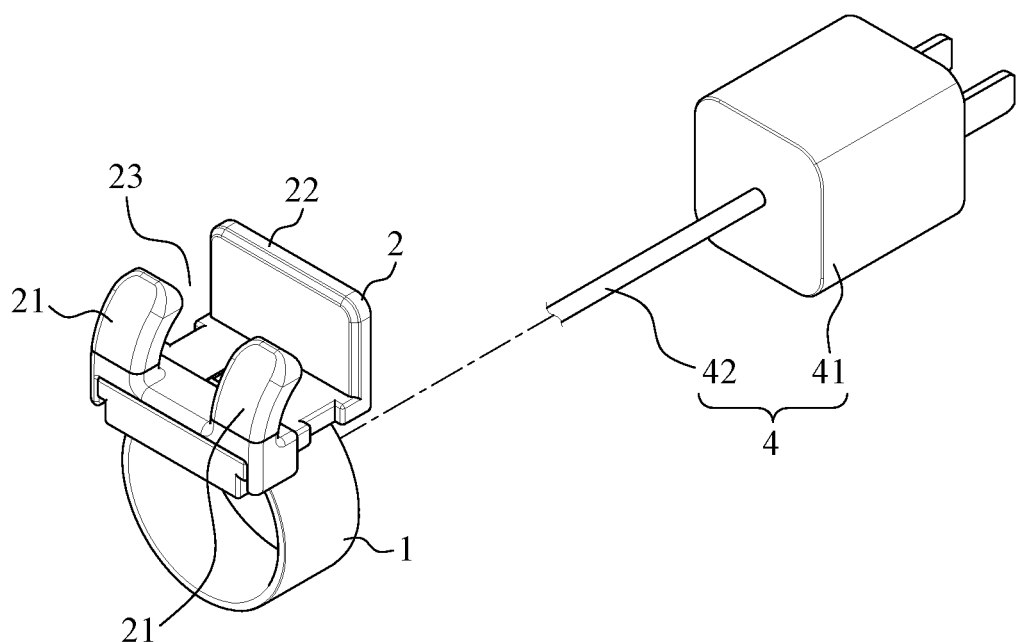
FIG. 1 is a perspective view of the fixing support bracket for charging connector of the present invention.

FIG. 1 shows a perspective view of the fixing support bracket for the charging connector of the present invention. The fixing support bracket for charging connector of the invention includes a tightening ring 1 and a carrying unit 2. The tightening ring 1 has elasticity and can expand in inner diameter when stretched. The carrying unit 2 is engaged to a partial section of the tightening ring 1. At least a front stopper 21 and at least one rear stopper 22 are erected on the carrying unit 2, and a placement space 23 is formed between the front stopper 21 and the rear stopper 22 for placing an object.

Figure 2:
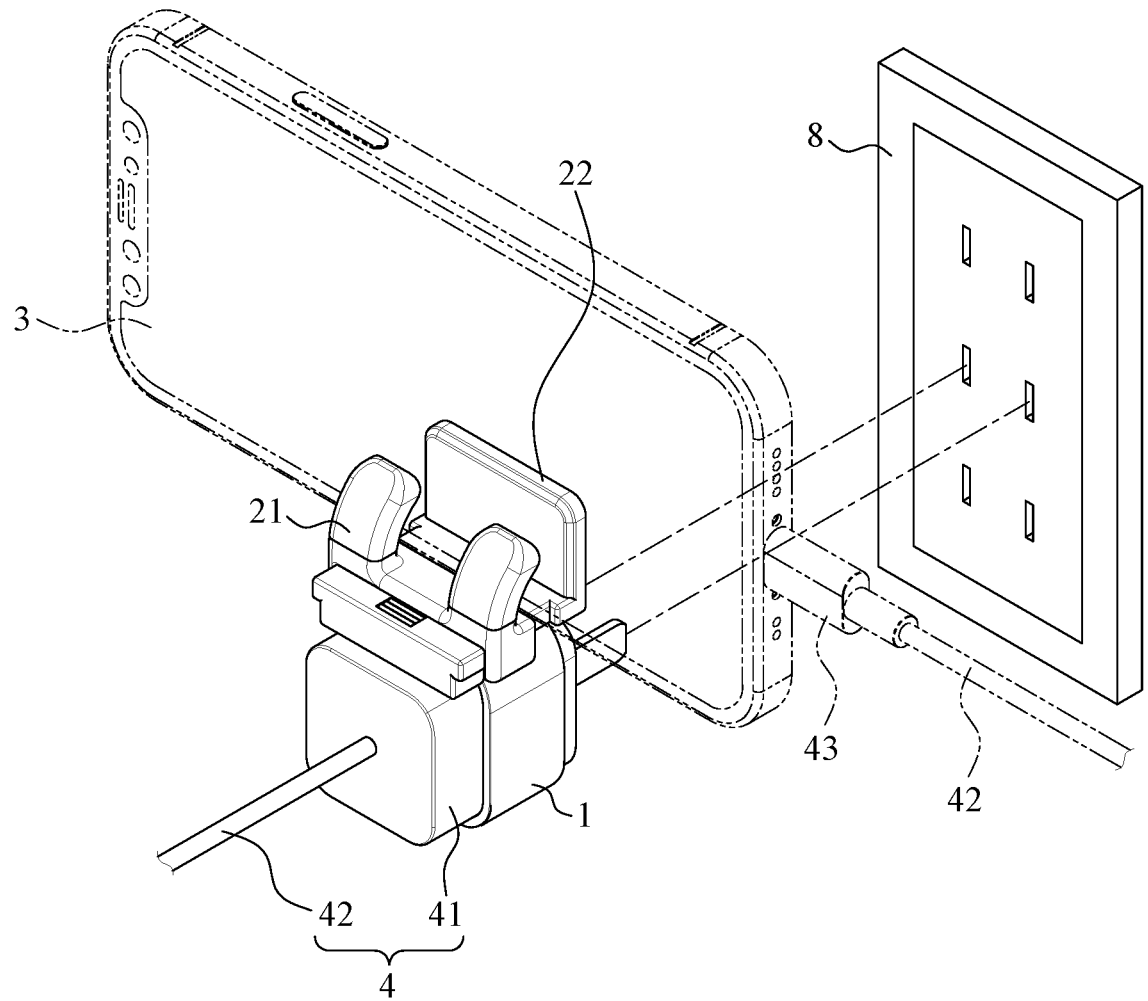
FIG. 2 is a schematic view of the usage state of the fixing support bracket for charging connector of the present invention.

The object can be an electronic mobile device, such as a mobile phone, a video player, a small camera, etc., as shown in FIG. 2. In the present embodiment, the object is a mobile phone 3, and the tightening ring 1 is placed on the periphery of a plug 41 of a charger 4. The plug 41 is inserted into a socket 8 on the wall, and then the mobile phone 3 is electrically connected with the connector 43 at the other end of the cable 42. As such, the mobile phone 3 will stand upright in the placement space 23, with the front and the back blocked by the front stopper 21 and the rear stopper 22 respectively, so that during charging, the mobile phone 3 is erected on the plug 41. Therefore, in the present invention, there will be no conventional scenario wherein the mobile phone is arbitrarily placed on the ground, so that a passerby accidentally kicks the cable 42 or the mobile phone 3, causing damage to the mobile phone 3.

The tightening ring 1 and the carrying unit 2 can be manufactured monolithically with a desired shape, so as to be product-specific. However, in order to expand the scope of application, the present invention provides another structure.

Figure 3:
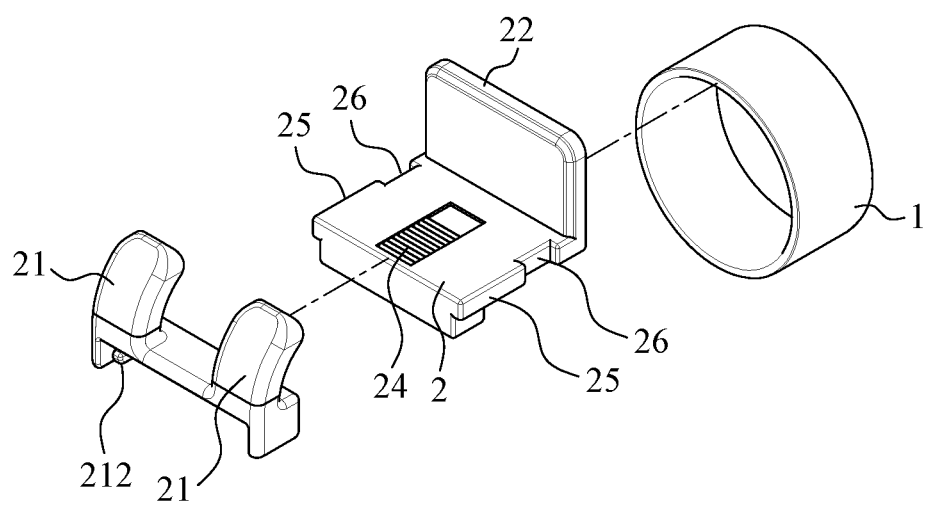
FIG. 3 is an exploded view of the fixing support bracket for charging connector of the present invention.
Figure 4:
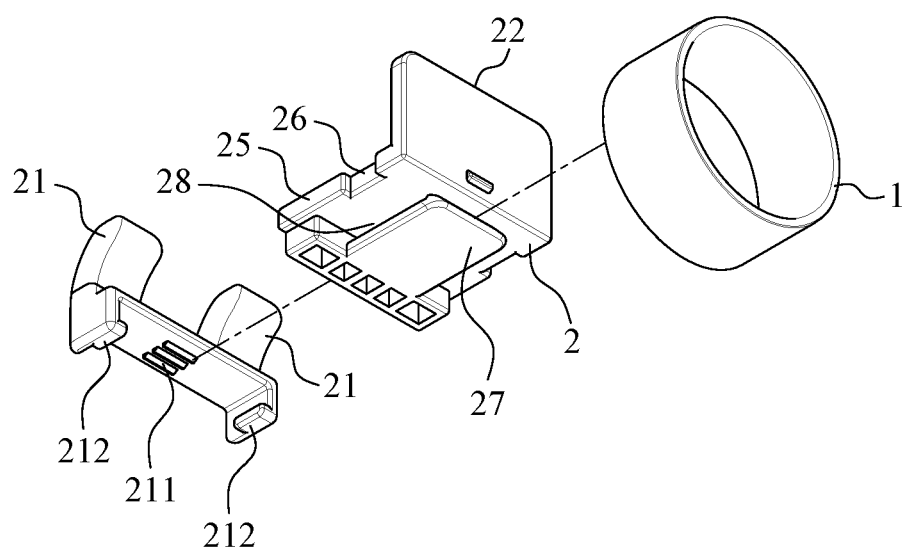
FIG. 4 is an exploded view from another angle of the fixing support bracket for charging connector of the present invention.
Figure 5:
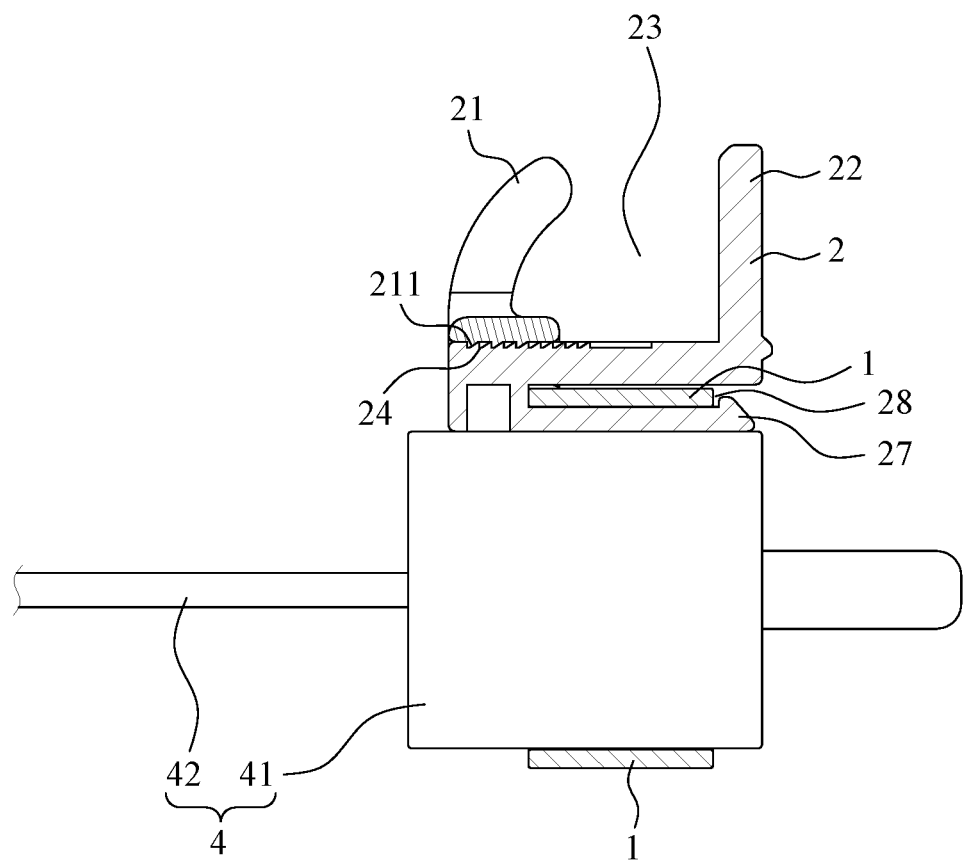
FIG. 5 is an enlarged schematic cross-sectional view of the fixing support bracket for charging connector of the present invention in the usage state.

As shown in FIGS. 2 and 3, the front stopper 21 is erected on the carrying unit 2 with an adjustable position, and the rear stopper 22 is non-movable and integrated with the carrying unit 2. The carrying unit 2 has a set of protruding teeth 24 formed on the top surface, and a protruding rail 25 is formed on both sides. As shown in FIG. 4, a set of unidirectional teeth 211 are formed on the bottom surface of the middle of the front stopper 21, and a hook-shaped holder 212 is formed on both sides extending downward. When assembling, the front stopper 21 is inserted from the end of the carrying unit 2 away from the rear stopper 22, and the hook-shaped holder 212 contacts the protruding rails 25 on both sides to facilitate the movement of the front stopper 21, as shown in FIG. 5. The unidirectional tooth 211 is clamped to the protruding tooth 24 in a unidirectional manner. When adjusting position, the front stopper 21 can only move toward the rear stopper 22 to reduce the size of the placement space 23 in accordance with the size of the mobile phone 3 to achieve the purpose of clamping and fixing.

After the adjustment, it may be necessary to readjust. Therefore, each of the protruding rails 24 forms a notch 26 adjacent to the rear stopper 22. When the front stopper 21 moves to the notch 26, the hook-shaped holder 212 can be slightly pushed outward to remove the front stopper 21 for reinserting in the above manner for readjusting the position.

The carrying unit 2 is engaged to a partial section of the tightening ring 1. The engagement method can be fixed by glue, but is not limited to herein. The present invention provides another embodiment including a stopping block 27 formed on the bottom surface of the carrying unit 2. A gap 28 is formed between the stopping block 27 and the carrying unit 2, and the gap 28 is for inserting the partial section of the tightening ring 1 so as to facilitate the coupling of the carrying unit 2 to the partial section of the tightening ring 1. In the present embodiment, the tightening ring 1 can be made of silicone or rubber material, which is elastic and can expand in the inner diameter after stretching. The carrying unit 2 is made of hard plastic or hard material to support the mobile phone 3, which is also easier to manufacture.

Figure 6A:
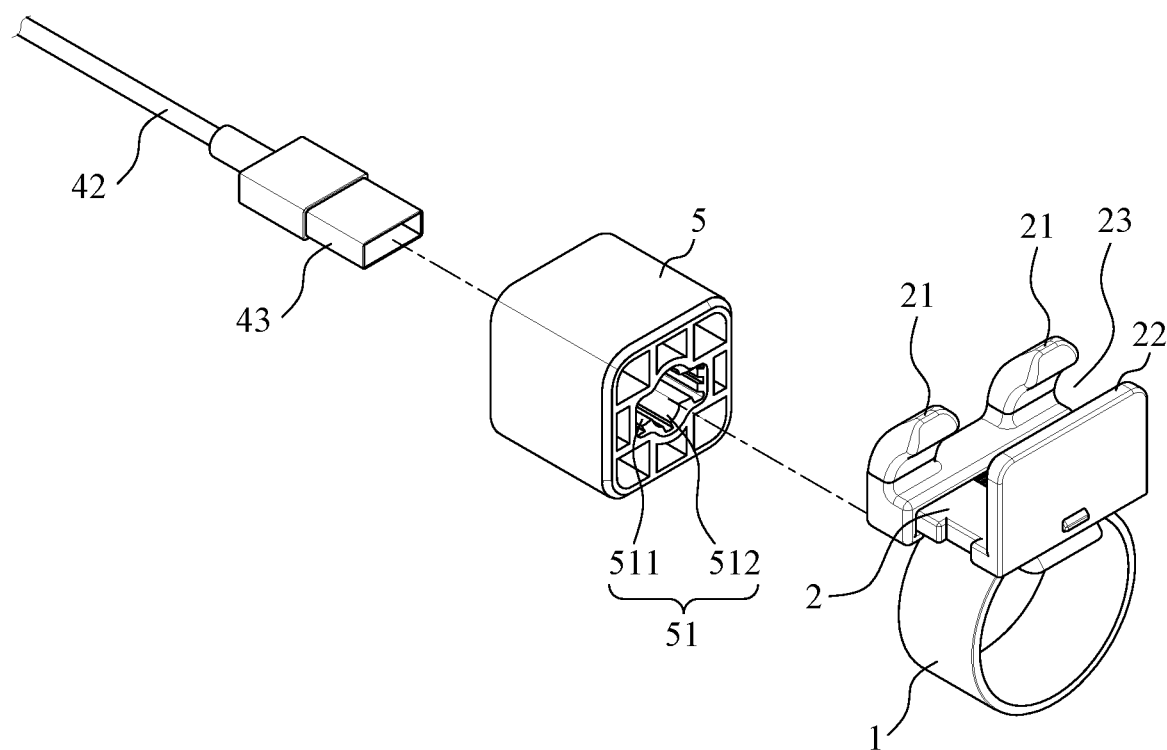
FIG. 6A is an exploded view of the fixing support bracket for charging connector and the adaptor of the present invention.
Figure 6B:
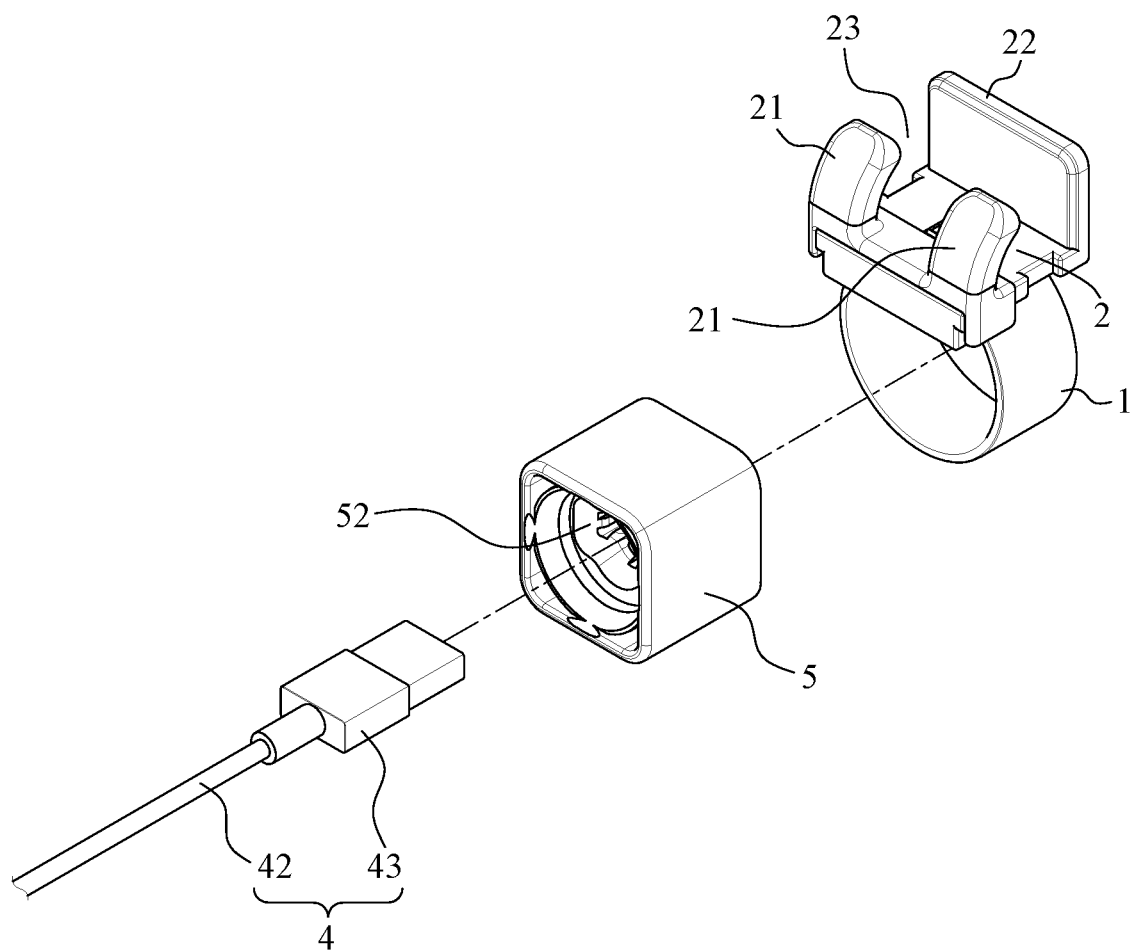
FIG. 6B is an exploded view from another angle of the fixing support bracket for charging connector and the adaptor of the present invention.
Figure 6C:
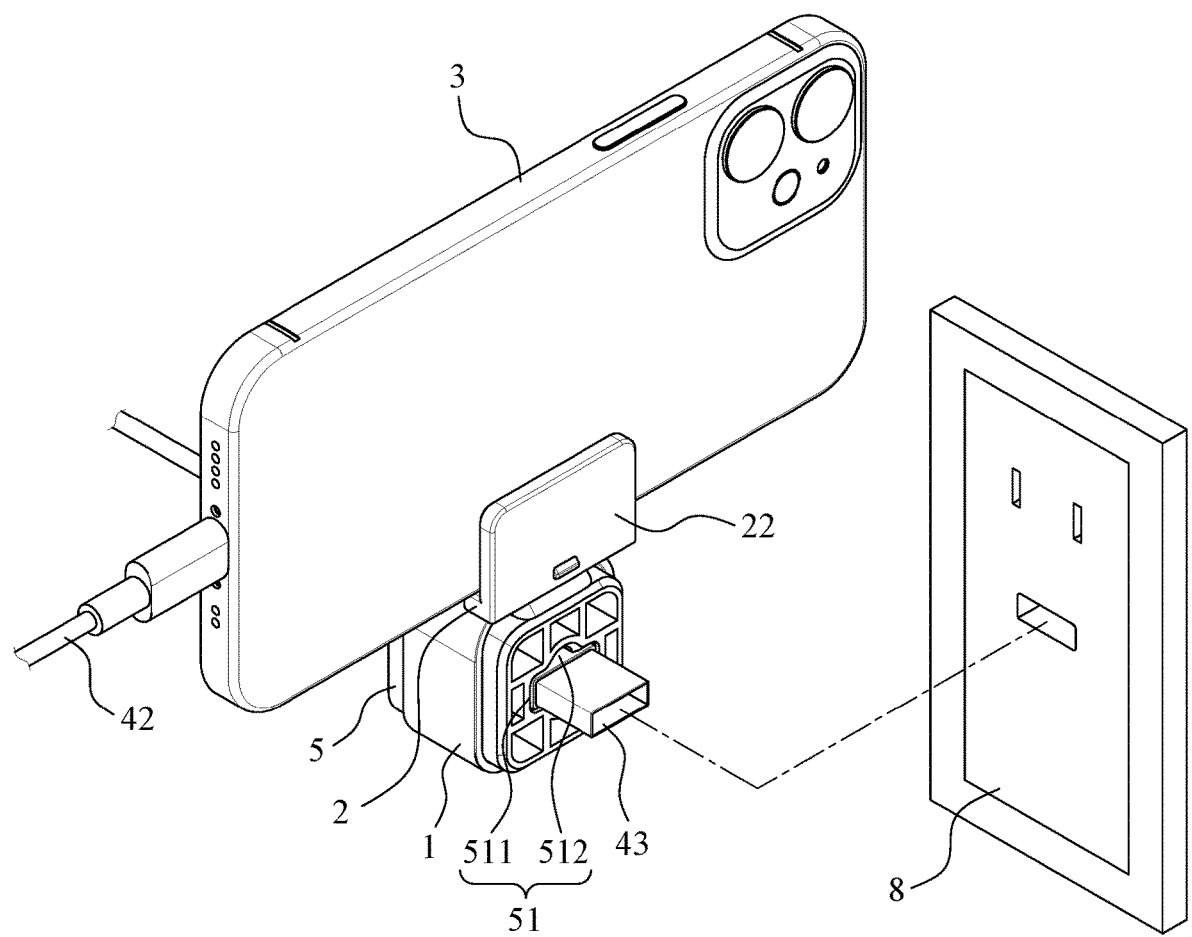
FIG. 6C is a use state view of the fixing support bracket for charging connector and the adaptor of the present invention.
Figure 6D:
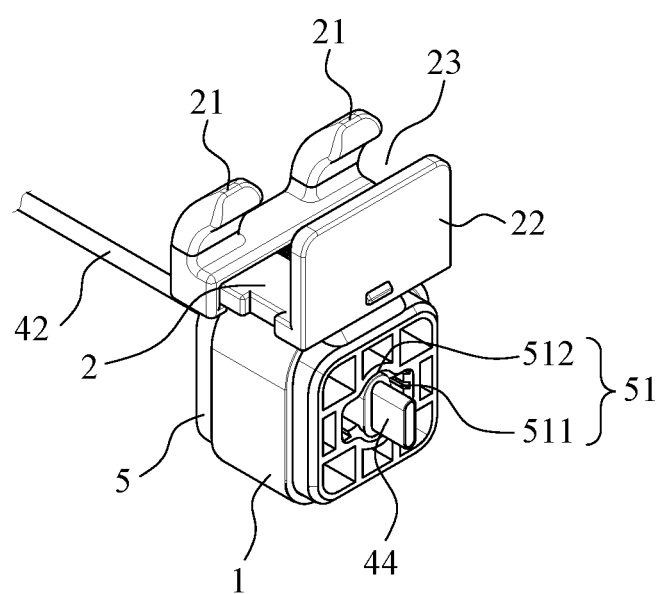
FIG. 6D is a schematic view of the fixing support bracket for charging connector and the adaptor of the present invention used with a connector of another specification.

In the aforementioned embodiment, the socket on the wall is a general power socket, but some sockets on the wall or the vertical wall of electrical equipment can provide sockets corresponding to the port specifications. Such ports can be USB, USB Type-C, Micro USB and Lightning, etc., which are generally based on USB specifications, and the present invention provides another solution for such scenarios. FIG. 6A and FIG. 6B are exploded views of the fixing support bracket for charging connector and an adapter of the present invention. The adapter 5 is an accessory. As shown in FIG. 6C, when in use, the adapter 5 is provided to be sleeved by the tightening ring 1, and then the corresponding connector 43 is inserted into the adapter 5. The shape and size of the adapter 5 must be larger than the inner diameter of the tightening ring 1 so that the tightening ring 1 becomes tightened around the periphery of the adapter 5 after sleeved. The shape of the adapter 5 can be rectangular, round or polygonal. The adapter 5 has at least one penetrating-through matching hole 51. The matching hole 51 is shaped to allow the insertion of the corresponding connector 43. The port specification is one of USB, USB Type-C, Micro USB and Lightning. However, in order to increase the scope of application of the present invention, in the present embodiment, the matching hole 51 is a cross-shaped hole, which is formed by crossing a first hole pattern 511 and a second hole pattern 512. The first hole pattern 511 and the second hole pattern 512 respectively provide two connectors 43 and 44 of different specifications and shapes. For example, as shown in FIG. 6C, if the first hole pattern 511 corresponds to the USB specification, the second hole type 512 corresponds to USB Type-C or Lightning specifications, as shown in FIG. 6D As shown, thereby increasing the scope of application of the present invention. As shown in FIG. 6C, when in use, the position of the adapter 5 in the tightening ring 1 is adjusted according to the shape of the connector 43, so that the connector 43 is inserted into the matching hole 51 of the adapter 5. As such, the mobile phone 3 can be placed on the carrying unit 2 during charging. As shown in FIG. 6B, in addition, the adapter 5 has a larger taper hole 52 that communicates with the matching hole 51. The taper hole 52 is used to facilitate the user to hold the insulating shell of the connector 43 and insert into the taper hole 52, and then the metal end of the connector 43 is extended from the matching hole 51.

In addition, some mobile phones 3 will use a wireless charging sensor for charging. This type of wireless charging sensor is divided into two categories. The first category is a wireless charging sensor with magnetism and can simultaneously hold mobile phones by the magnetic force when charging, such as Apple's iPhone 13 charger. Another category of wireless charging sensor is without magnetism and only provides wireless inductive charging. Therefore, the present invention also designed two accessories to meet actual application.

Figure 7A:
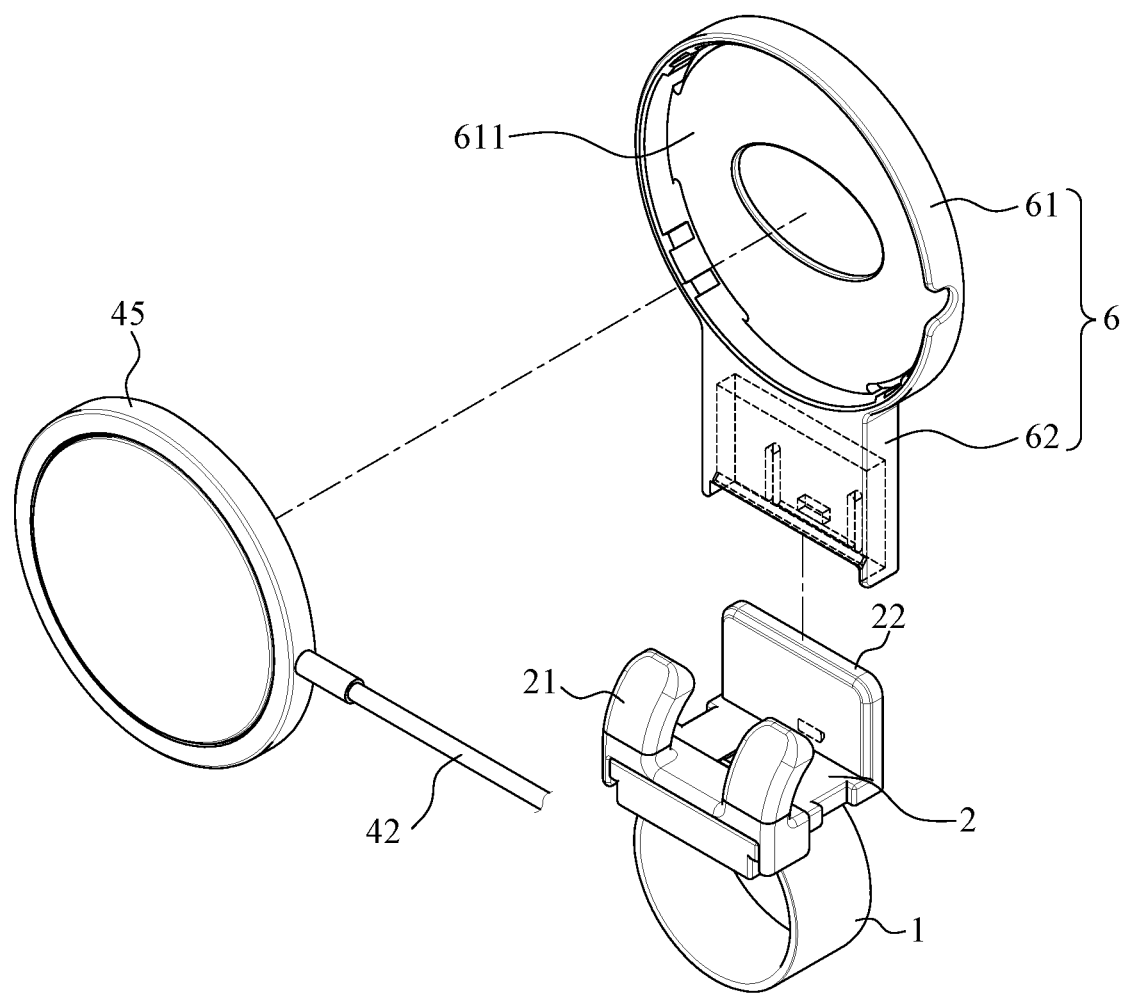
FIG. 7A is an exploded view of the fixing support bracket for charging connector and the support carrier of the present invention.
Figure 7B:
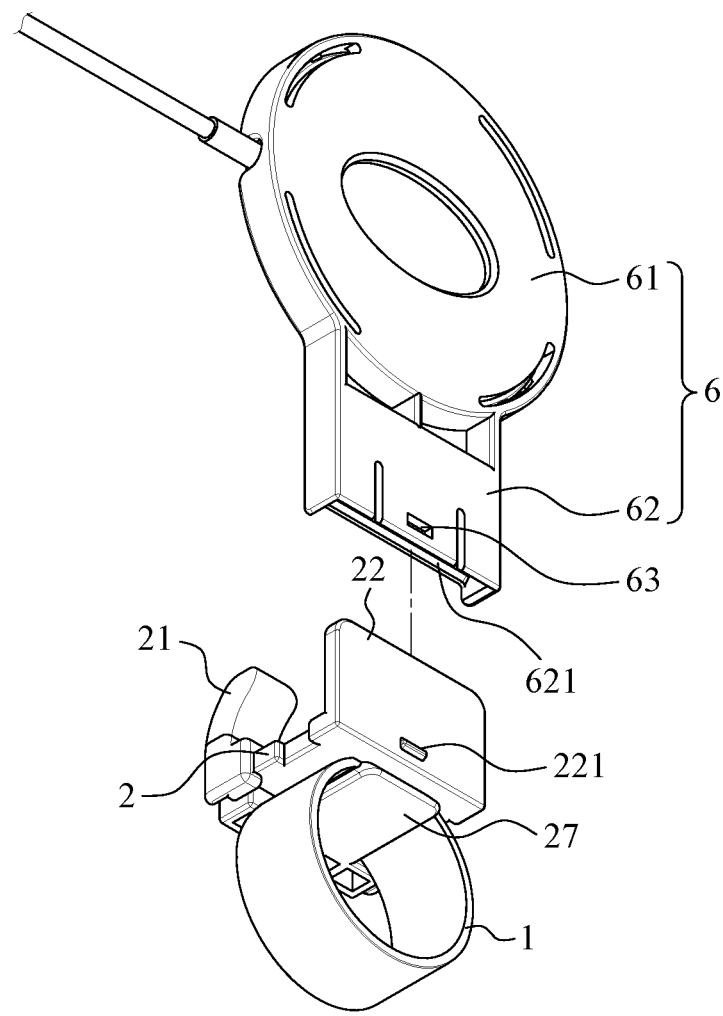
FIG. 7B is an exploded view from another angle of the fixing support bracket for charging connector and the support carrier of the present invention.

FIG. 7A and FIG. 7B are exploded views of the fixing support bracket for charging connector and a support carrier for the present invention. In the present embodiment, the wireless charging sensor 45 is located at one end of the cable 42 and has magnetism. The mobile phone can also be attached when charging. The support carrier 6 includes a carrier base 61 and a sleeve part 62 connected up and down. The carrier base 61 has an accommodation groove 611 in which the wireless charging sensor 45 can be placed. The sleeve part 62 is hollow and has an opening 621 facing downwards. The size of hollow of the sleeve part 62 corresponds to the rear stopper 22. When the sleeve part 62 is sheathed on the rear stopper 22, the support carrier 6 can stand on the carrying unit 2.

In addition, in order to ensure the firmness after assembly, as shown in FIG. 7B, the rear stopper 22 is further formed with a positioning block 221, and the sleeve part 62 is further formed with a slot 63 in the corresponding position. When the rear stopper 22 is inserted into the sleeve part 62 through the opening 621, the positioning block 221 is located in the slot 63, so that the support carrier 6 cannot be easily detached from the carrying unit 2.

Figure 7C:
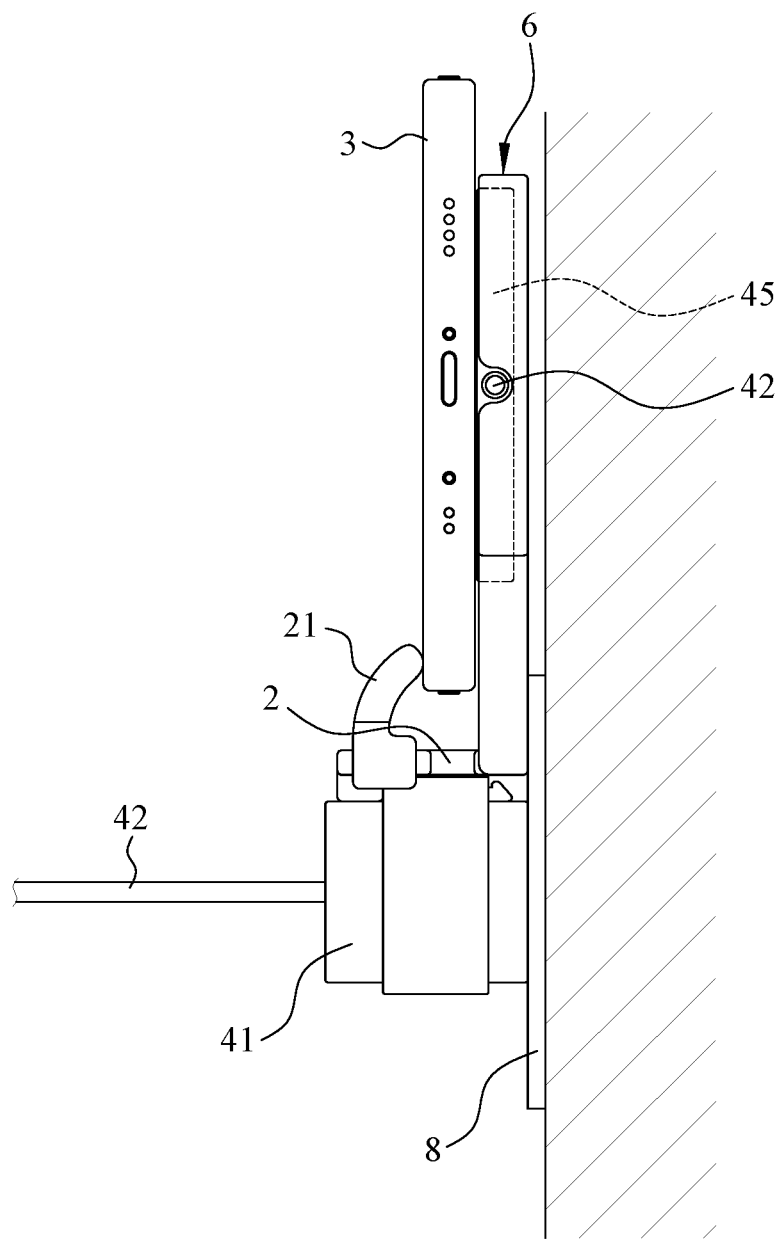
FIG. 7C is a schematic view of the use state of the fixing support bracket for charging connector and the support carrier of the present invention.

FIG. 7C is a schematic view of the state of use of the present embodiment. The plug 41 is inserted into the wall socket 8 to provide power to the wireless charging sensor 45, the mobile phone 3 will be attracted by the magnetic force of the wireless charging sensor 45, and then attached to the support carrier 6, thereby charging. As such, the mobile phone 3 is restricted to stay on the carrying unit 2.

Figure 8A:
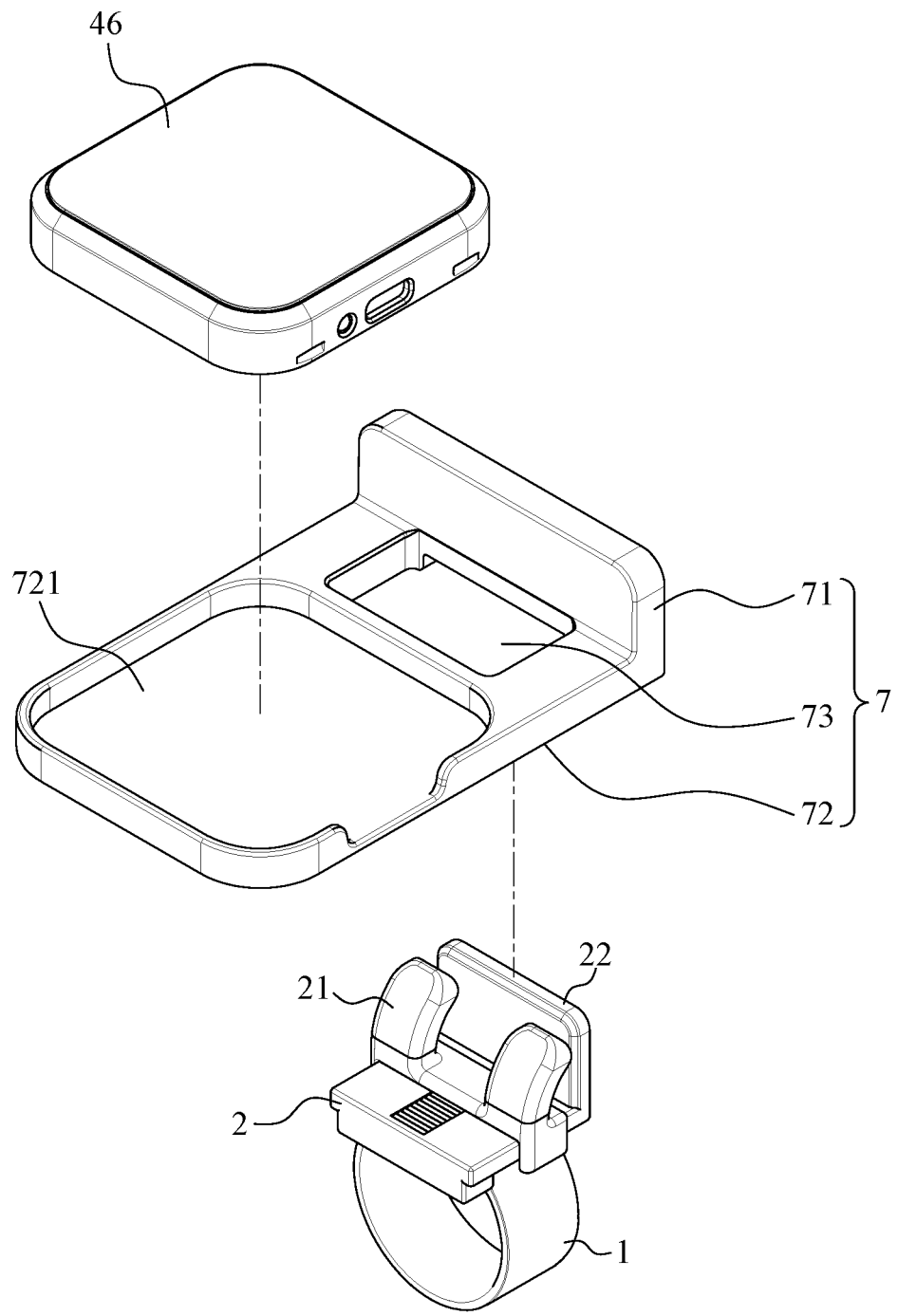
FIG. 8A is an exploded view of the fixing support bracket for charging connector and the receiving carrier of the present invention.
Figure 8B:
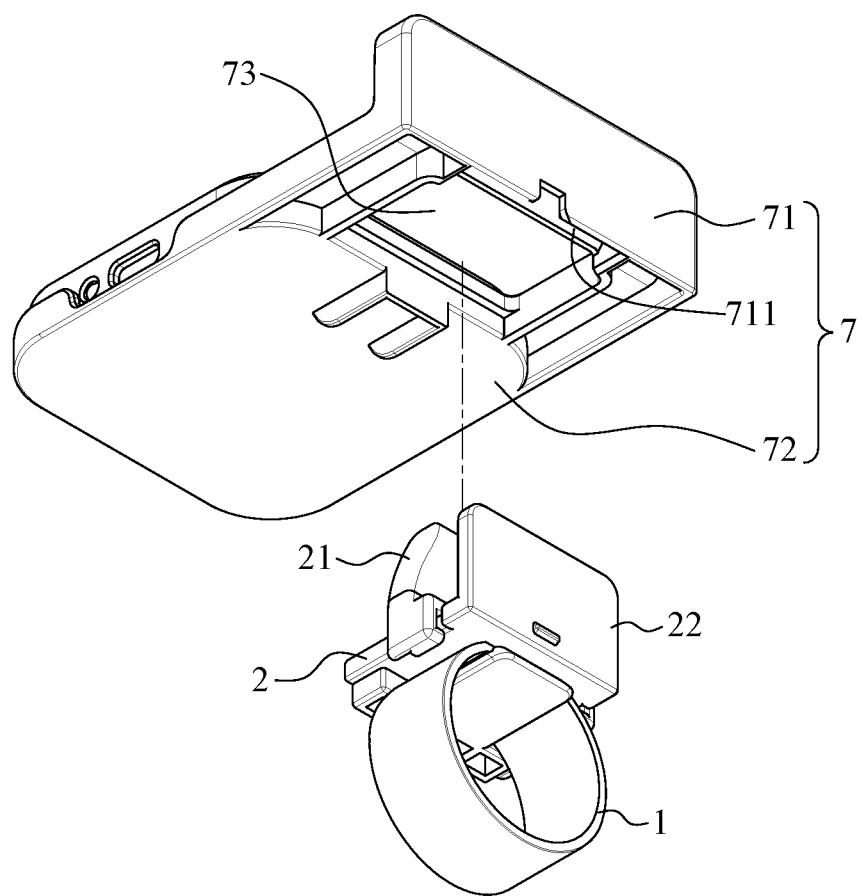
FIG. 8B is an exploded view from another angle of the fixing support bracket for charging connector and the receiving carrier of the present invention.
Figure 8C:
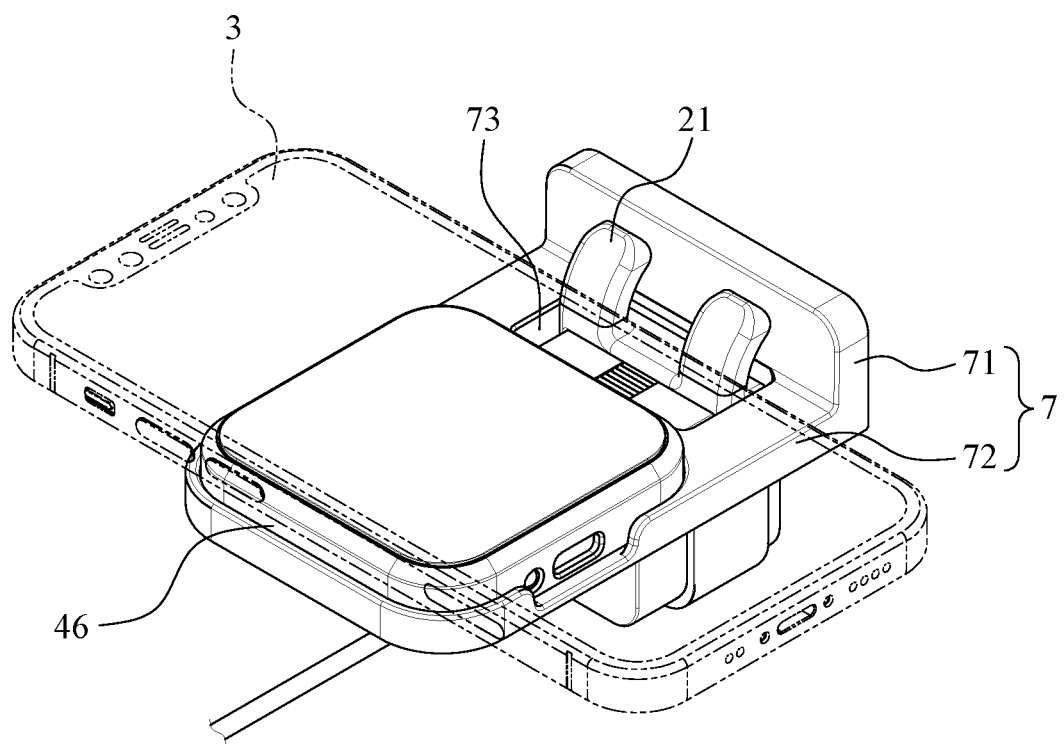
FIG. 8C is a schematic view of the use of the fixing support bracket for charging connector and the receiving carrier of the present invention.
Figure 8D:
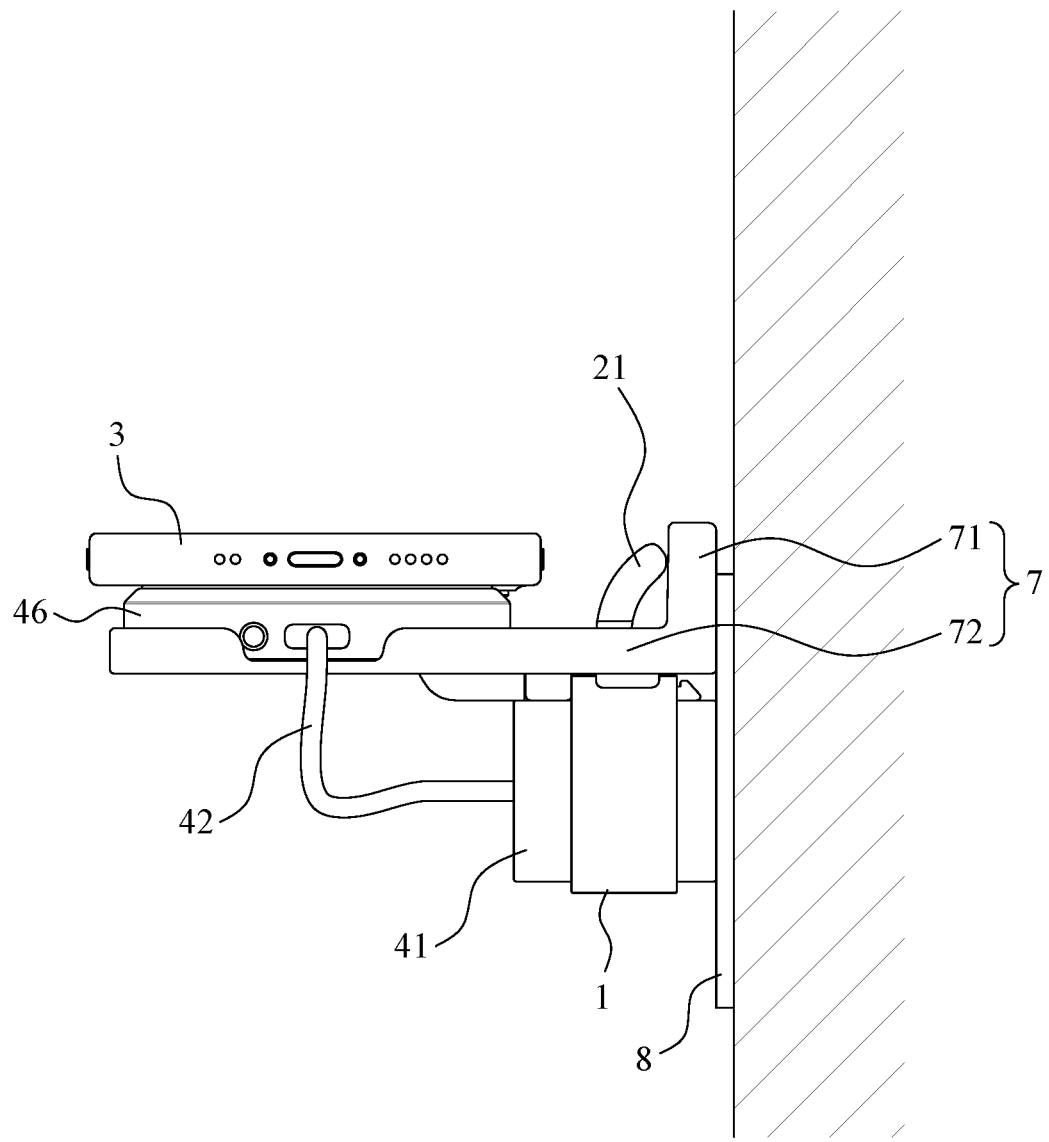
FIG. 8D is a side view of the fixing support bracket for charging connector and the receiving carrier of the present invention.

FIG. 8A and FIG. 8B are exploded views of the fixing support bracket for charging connector and a receiving carrier of the present invention. The present embodiment provides a platform is for placing the mobile phone 3 horizontally, and the receiving carrier 7 can also be optionally equipped with a wireless charging sensor 46. The receiving carrier 7 comprises an upright support part 71 and a horizontal support plate 72. The support part 71 is hollow and has an opening 711 facing downward. The size of the hollow of the support part 71 corresponds to the rear stopper 22. When the support part 71 is sheathed on the rear stopper 22, the support plate 72 can be positioned on the carrying unit 2 horizontally. In addition, in order to avoid component interference, a window 73 is formed adjacent to the support part 71 on the support plate 72, and the window 73 is larger in size than the corresponding front stopper 21. In addition, a receiving groove 721 is formed on the support plate 72, and the receiving groove 721 is used for placing the wireless charging sensor 46 of another specification. The wireless charging sensor 46 in the present embodiment only provides a wireless charging sensing function, and does not have magnetism. In addition, if the wireless charging sensor 46 is not installed, the support plate 72 can be a flat surface for the mobile phone 3 to lie flat FIG. 8C and FIG. 8D are schematic views of the present invention in actual use. The wireless charging sensor 46 is mounted on the support plate 72, and the front stopper 21 is moved to be close to the rear stopper 22. The rear stopper 22 is inserted into the support part 71 when the receiving carrier 7 is placed from top to bottom. The front stopper 21 is located in the window 73. The wireless charging sensor 46 is connected with the cable 42, and the mobile phone 3 is charged by the wireless charging sensor 46, and the mobile phone 3 is placed on the support plate 72.

In summary, the fixing support bracket for charging connector of the present invention uses the tightening ring 1 to fasten the plug 41 or the adapter 5, thereby allowing the insertion of the plug 41 or the adapter 5. The connector 43 can be inserted into the socket, and the carrying unit 2 is responsible for carrying the mobile phone 3, so that the mobile phone 3 can be carried during charging. In addition, depending on the use of different wireless charging sensors 45 and 46, different accessories can also be used, such as the support carrier 6 and the receiving carrier 7, to perform wireless charging operations, thereby meeting different usage requirements and achieving the purpose of accommodating the mobile phone 3 during charging. The overall structure is simple, easy to use, and conforms to the requirements of a patent application.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fixing support bracket for charging connector, comprising: a tightening ring and a carrying unit; wherein the tightening ring is elastic and expandable in diameter when stretched, the carrying unit is engaged to a partial section of the tightening ring, at least a front stopper and at least a rear stopper are erected on the carrying unit, with a placement space between the front stopper and the rear stopper, and the placement space is used for placing an object; wherein the front stopper is adjustable in position and the carrying unit is disposed with a set of protruding teeth on a top surface, a protruding rail on two sides, a unidirectional tooth on a bottom surface of the front stopper, and each of the two sides extends downward to form a hook-shaped holder; when assembling, the front stopper contacts the protruding rail by the two hook-shaped holders, so that the front stopper can move on the carrying unit, and the unidirectional tooth is clamped in the protruding teeth at an appropriate position.

2. The fixing support bracket for charging connector according to claim 1, wherein a charger has a plug, and the tightening ring serves as a sleeve on the periphery of the plug.

3. The fixing support bracket for charging connector according to claim 1, wherein a stopping block is formed on a bottom of the carrying unit, and a gap is formed between the stopping block and the carrying unit for placing a partial section of the tightening ring so that the carrying unit is engaged to the partial section of the tightening ring.

4. The fixing support bracket for charging connector according to claim 1, further comprising an adapter, wherein the tightening ring serves as a sleeve on the periphery of the adapter, and at least a matching hole is formed in the middle of the adapter, and the matching hole corresponds to a connector, the connector corresponds to an appearance of a port, and the port is one of USB, USB Type-C, Micro USB, and Lightning.

5. The fixing support bracket for charging connector according to claim 4, wherein the matching hole is a cross-shaped hole, the matching hole is formed by a first hole pattern crossing a second hole pattern, the shape of the first hole pattern is different from the second hole pattern, and the first hole pattern and the second hole pattern respectively correspond to different connector shapes.

6. The fixing support bracket for charging connector according to claim 1, further comprising a support carrier, wherein the support carrier comprises a carrier base connected to a sleeve part, the carrier base is for accommodating a wireless charging sensor, the sleeve part has a hollow with an opening facing downward, and the size of the hollow of the sleeve part corresponds to the rear stopper; when the sleeve part is sheathed on the rear stopper, the support carrier can be erected on the carrying unit.

7. The fixing support bracket for charging connector according to claim 1, further comprising a receiving carrier, wherein the receiving carrier comprises an upright support part and a horizontal support plate, the upright support part has a hollow with an opening facing downward, and the size of the hollow of the upright support part corresponds to the rear stopper; when the upright support part is sheathed on the rear stopper, the horizontal support plate can be horizontally positioned on the carrying unit.

8. The fixing support bracket for charging connector according to claim 7, wherein the horizontal support plate is further formed with a receiving groove, and the receiving groove is used for receiving a wireless charging sensor.

9. A fixing support bracket for charging connector, comprising: a tightening ring and a carrying unit; wherein the tightening ring is elastic and expandable in diameter when stretched, the carrying unit is engaged to a partial section of the tightening ring, at least a front stopper and at least a rear stopper are erected on the carrying unit, with a placement space between the front stopper and the rear stopper, and the placement space is used for placing an object; wherein a stopping block is formed on a bottom of the carrying unit, and a gap is formed between the stopping block and the carrying unit for placing a partial section of the tightening ring so that the carrying unit is engaged to the partial section of the tightening ring.

10. The fixing support bracket for charging connector according to claim 9, wherein a charger has a plug, and the tightening ring serves as a sleeve on the periphery of the plug.

11. The fixing support bracket for charging connector according to claim 9, wherein the front stopper is adjustable in position.

12. The fixing support bracket for charging connector according to claim 9, further comprising an adapter, wherein the tightening ring serves as a sleeve on the periphery of the adapter, and at least a matching hole is formed in the middle of the adapter, and the matching hole corresponds to a connector, the connector corresponds to an appearance of a port, and the port is one of USB, USB Type-C, Micro USB, and Lightning.

13. The fixing support bracket for charging connector according to claim 12, wherein the matching hole is a cross-shaped hole, the matching hole is formed by a first hole pattern crossing a second hole pattern, the shape of the first hole pattern is different from the second hole pattern, and the first hole pattern and the second hole pattern respectively correspond to different connector shapes.

14. The fixing support bracket for charging connector according to claim 9, further comprising a support carrier, wherein the support carrier comprises a carrier base connected to a sleeve part, the carrier base is for accommodating a wireless charging sensor, the sleeve part has a hollow with an opening facing downward, and the size of the hollow of the sleeve part corresponds to the rear stopper; when the sleeve part is sheathed on the rear stopper, the support carrier can be erected on the carrying unit.

15. The fixing support bracket for charging connector according to claim 9, further comprising a receiving carrier, wherein the receiving carrier comprises an upright support part and a horizontal support plate, the upright support part has a hollow with an opening facing downward, and the size of the hollow of the upright support part corresponds to the rear stopper; when the upright support part is sheathed on the rear stopper, the horizontal support plate can be horizontally positioned on the carrying unit.

16. The fixing support bracket for charging connector according to claim 15, wherein the horizontal support plate is further formed with a receiving groove, and the receiving groove is used for receiving a wireless charging sensor.

* * * * *